US010339792B2

(12) United States Patent
Adamo, Jr. et al.

(10) Patent No.: US 10,339,792 B2
(45) Date of Patent: Jul. 2, 2019

(54) SYSTEM, METHOD, AND RECODING MEDIUM FOR EMERGENCY IDENTIFICATION AND MANAGEMENT USING SMART DEVICES AND NON-SMART DEVICES

(71) Applicant: International Business Machines Corporation, Armonk, NY (US)

(72) Inventors: David T. Adamo, Jr., Denton, TX (US); Matous Havlena, Rudoltice (CZ); Stacy Fay Hobson, Poughkeepsie, NY (US); Roman Vaculin, Bronxville, NY (US)

(73) Assignee: INTERNATIONAL BUSINESS MACHINES COPORATION, Armonk, NY (US)

( * ) Notice: Subject to any disclaimer, the term of this patent is extended or adjusted under 35 U.S.C. 154(b) by 0 days.

(21) Appl. No.: 15/849,445

(22) Filed: Dec. 20, 2017

(65) Prior Publication Data
US 2018/0114429 A1  Apr. 26, 2018

Related U.S. Application Data

(63) Continuation of application No. 15/055,831, filed on Feb. 29, 2016, now Pat. No. 9,940,823.

(51) Int. Cl.
*G08B 25/10* (2006.01)
*G08B 25/01* (2006.01)
(Continued)

(52) U.S. Cl.
CPC ........... *G08B 25/10* (2013.01); *G08B 25/001* (2013.01); *G08B 25/016* (2013.01); *G08B 25/08* (2013.01);
(Continued)

(58) Field of Classification Search
CPC ....... G08B 25/10; G08B 25/016; H04W 4/90; H04W 4/22; H04W 8/005
See application file for complete search history.

(56) References Cited

U.S. PATENT DOCUMENTS 7,301,455 B2 * 11/2007 McKenna ............ G08B 25/009
                                                        340/506
8,384,539 B2    2/2013 Denny et al.
(Continued)

FOREIGN PATENT DOCUMENTS

WO    WO 2006/135120 A1    12/2006

OTHER PUBLICATIONS

United States Notice of Allowance dated Dec. 5, 2017 in U.S. Appl. No. 15/055,831.

(Continued)

*Primary Examiner* — Nathan A Mitchell
(74) *Attorney, Agent, or Firm* — Rahan Uddin, Esq.; McGinn IP Law Group, PLLC

(57) ABSTRACT

An emergency method, system, and non-transitory computer readable medium include a detection device configured to detect an emergency situation and switch a first device to emergency mode, an emergency mode device configured to gather information regarding the emergency situation while the first device is in emergency mode, and an actuation and discovery device configured to discover a second device in a vicinity of the first device and actuate the second device to perform an action based on the emergency situation detected by the detection device.

20 Claims, 9 Drawing Sheets

(51) Int. Cl.
*H04W 4/90* (2018.01)
*G08B 25/00* (2006.01)
*G08B 25/08* (2006.01)
*G08B 29/18* (2006.01)
*H04W 8/00* (2009.01)
*G08B 7/06* (2006.01)

(52) U.S. Cl.
CPC ............ *G08B 29/188* (2013.01); *H04W 4/90* (2018.02); *G08B 7/066* (2013.01); *H04W 8/005* (2013.01)

(56) References Cited

U.S. PATENT DOCUMENTS

| | | | |
|---|---|---|---|
| 8,929,853 | B2 | 1/2015 | Butler |
| 9,183,731 | B1 | 11/2015 | Bokhary |
| 2008/0318564 | A1* | 12/2008 | Kreiner ................ G08C 17/02 455/420 |
| 2009/0098898 | A1* | 4/2009 | Patterson ............. H04L 1/0014 455/521 |
| 2009/0267756 | A1* | 10/2009 | Denny .................. G08G 1/205 340/521 |
| 2010/0159871 | A1 | 6/2010 | Tester |
| 2010/0279647 | A1* | 11/2010 | Jacobs .................. H04W 4/008 455/404.1 |
| 2011/0163872 | A1 | 7/2011 | Pasveer et al. |
| 2012/0322401 | A1 | 12/2012 | Collins |
| 2015/0065078 | A1* | 3/2015 | Mejia ..................... G08B 17/00 455/404.1 |
| 2015/0140924 | A1* | 5/2015 | Marathe ................ H04W 4/90 455/3.01 |
| 2015/0264547 | A1* | 9/2015 | Kobayashi ............ G06Q 50/26 455/404.2 |
| 2015/0339904 | A1* | 11/2015 | Puskarich ............. G08B 17/11 455/556.1 |

OTHER PUBLICATIONS

United States Office Action dated Nov. 14, 2017 in U.S. Appl. No. 15/055,831.
United States Office Action dated Jun. 22, 2017 in U.S. Appl. No. 15/055,831.
United States Office Action dated Mar. 31, 2017 in U.S. Appl. No. 15/055,831.
United States Office Action dated Mar. 15, 2017 in U.S. Appl. No. 15/055,831.
Schneppe et al., "Wired Smart Home: energy metering, security, and Emergency issues", IEEE, 2012.

* cited by examiner

SYSTEM, METHOD, AND RECODING MEDIUM FOR EMERGENCY IDENTIFICATION AND MANAGEMENT USING SMART DEVICES AND NON-SMART DEVICES

CROSS-REFERENCE TO RELATED APPLICATIONS

The present application is a Continuation Application of U.S. patent application Ser. No. 15/055,831, filed on Feb. 29, 2016, the entire contents of which are hereby incorporated by reference.

BACKGROUND

The present invention relates generally to an emergency prediction, detection, reporting, and mitigation system, and more particularly, but not by way of limitation, to a system for instrumenting and coordinating multiple personal devices and appliances so that the devices are capable of predicting, detecting, reporting, monitoring, and mitigating emergency situations using device sensing, actuating, and location identification.

Personal devices can communicate with each other over networks such as local area networks, wide area networks, and the Internet. Mobile devices such as cell phones, including so-called smart phones, can communicate with each other wirelessly over a variety of wireless networks.

Conventional techniques of creating emergency connections focus only on smartphone devices. The conventional techniques do not make use of both smart and non-smart devices that do not have to be necessarily mobile devices. Also, the conventional techniques coordinate a single device. That is, the conventional techniques only consider safety of individuals carrying their mobile devices, while failing to provide detection of emergency situations and creation of an ad hoc network of smart and non-smart devices that would allow one to predict, detect, report and mitigate emergency situations.

Thus, there is a technical problem in the conventional techniques that the techniques are incapable of providing an emergency system that can create an ad hoc network between smart devices and non-smart devices so as to provide contextual and localized information that can be used to address the emergency situation.

SUMMARY

In an exemplary embodiment, the present invention can provide an emergency system, including a detection device configured to detect an emergency situation and switch a first device to emergency mode, an emergency mode device configured to gather information regarding the emergency situation while the first device is in emergency mode, and an actuation and discovery device configured to discover a second device in a vicinity of the first device and actuate the second device to perform an action based on the emergency situation detected by the detection device.

Further, in another exemplary embodiment, the present invention can provide a non-transitory computer-readable recording medium recording an emergency program, the program causing a computer to perform: detecting an emergency situation and switch a first device to emergency mode, controlling the first device in the emergency mode to gather information regarding the emergency situation while the first device is in emergency mode, discovering a second device in a vicinity of the first device, and actuating the second device to perform an action based on the emergency situation detected by detecting.

Even further, in another exemplary embodiment, the present invention can provide an emergency method, including detecting an emergency situation and switch a first device to emergency mode, controlling the first device in the emergency mode to gather information regarding the emergency situation while the first device is in emergency mode, discovering a second device in a vicinity of the first device, and actuating the second device to perform an action based on the emergency situation detected by detecting.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
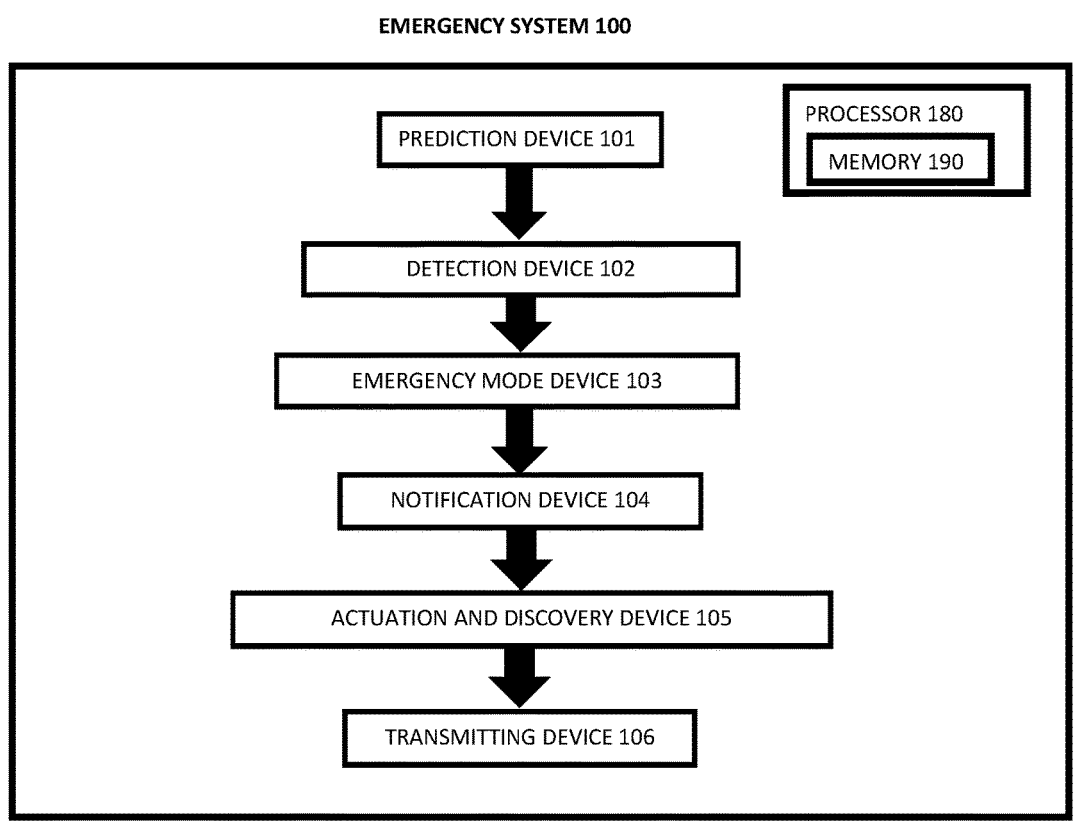
FIG. 1 exemplarily shows a block diagram illustrating a configuration of an emergency system 100.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the emergency system 100 includes a prediction device 101, a detection device 102, an emergency mode device 103, a notification device 104, an actuation and discovery device 105, and a transmitting device 106. The emergency system 100 includes a processor 180 and a memory 190, with the memory 190 storing instructions to cause the processor 180 to execute each device of emergency system 100.

Although the emergency system 100 includes various devices, it should be noted that an emergency system can include modules in which the memory 190 stores instructions to cause the processor 180 to execute each module of emergency system 100.

With the use of these various devices, the emergency system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties such as any of perception, goal-oriented behavior, learning/memory and action that characterize systems (i.e., humans) that all agree are cognitive.

Figure 7:
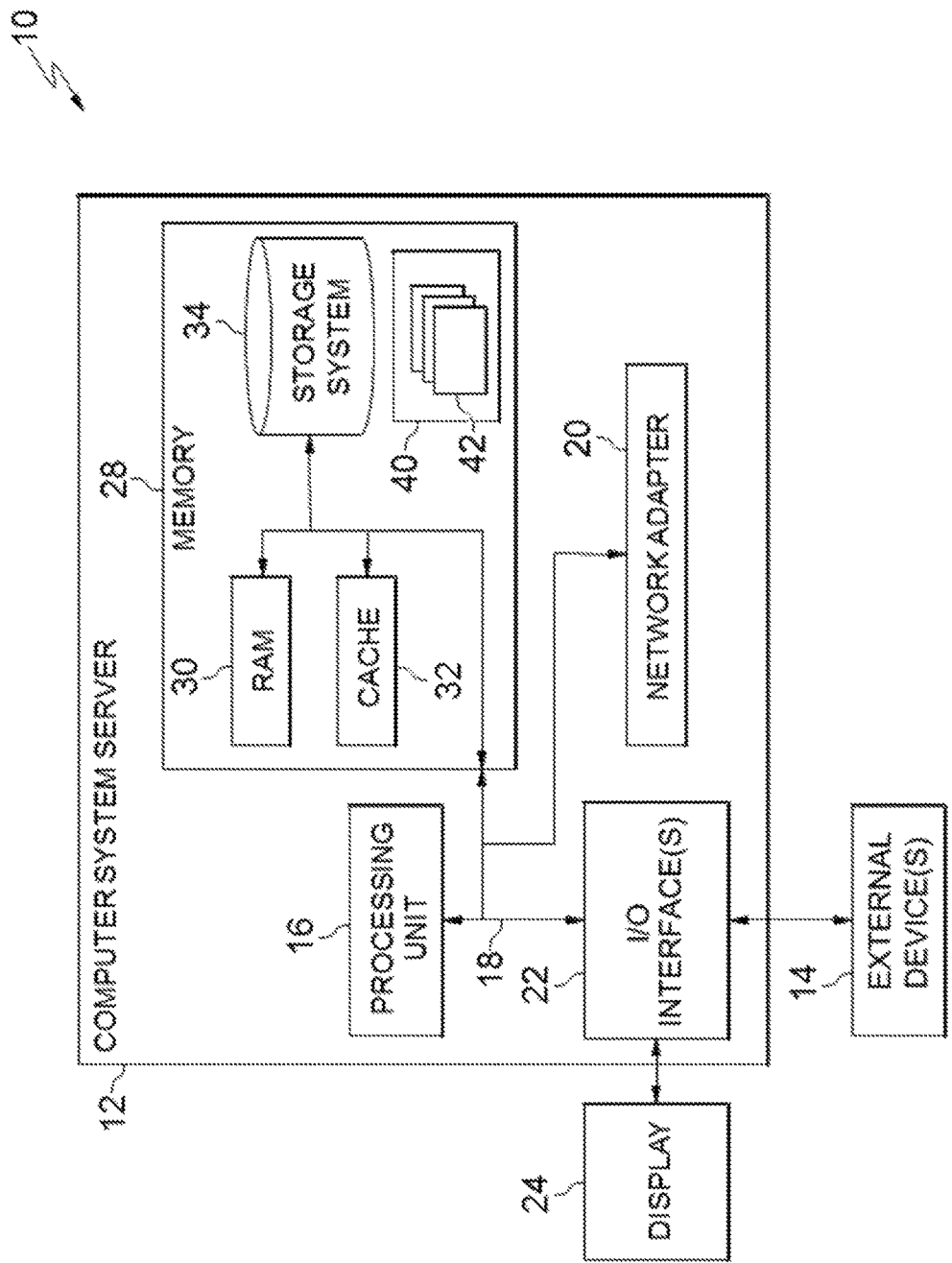
FIG. 7 depicts a cloud computing node according to an embodiment of the present invention.
Figure 8:
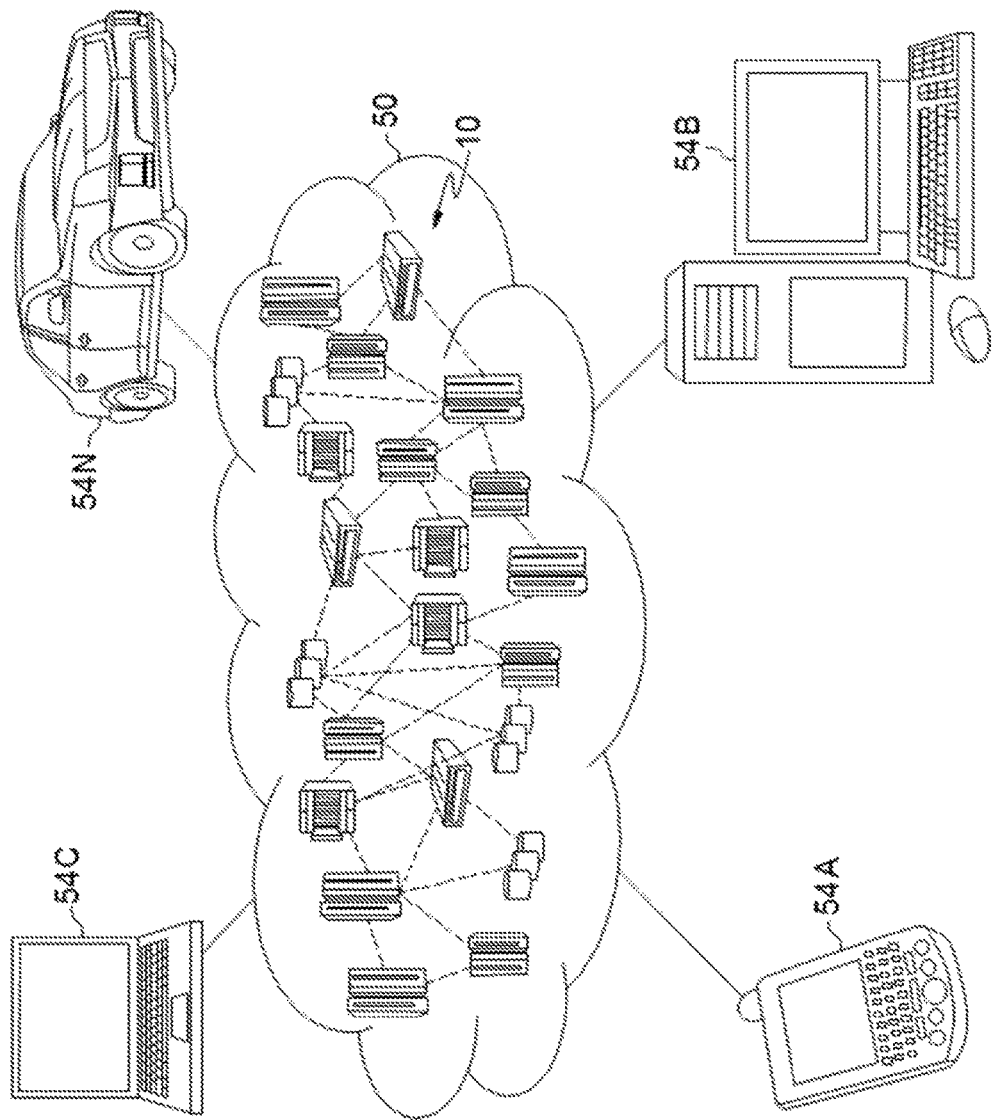
FIG. 8 depicts a cloud computing environment according to another embodiment of the present invention.
Figure 9:
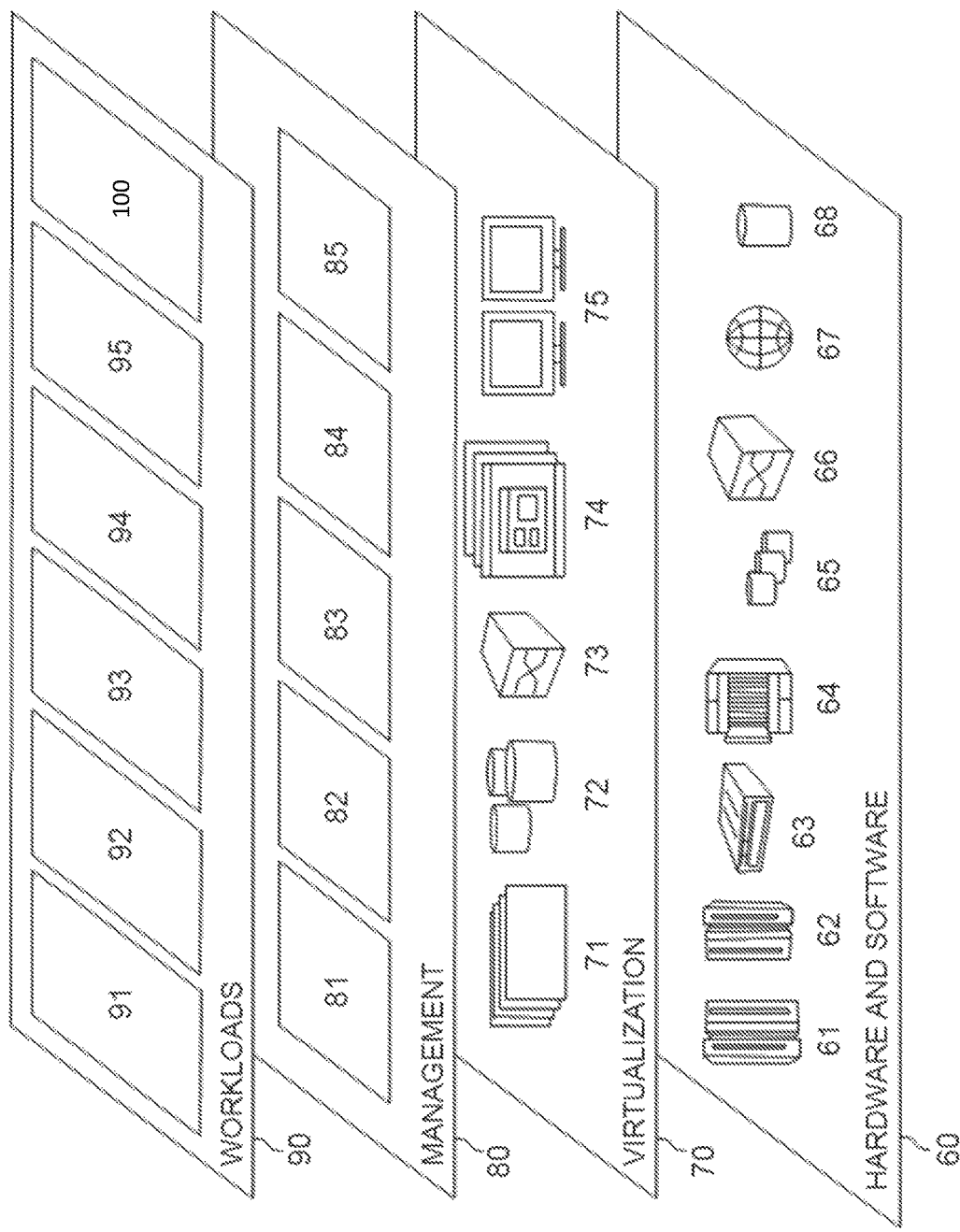
FIG. 9 depicts abstraction model layers according to an embodiment of the present invention.

Although as shown in FIGS. 7-9 and as described later, the computer system/server 12 is exemplarily shown in cloud computing node 10 as a general-purpose computing device which may execute in a layer the emergency system 100 (FIG. 5), it is noted that the present invention can be implemented outside of the cloud environment.

Smart devices referred to herein are connected to the Internet or some other network enabling convenient transfer of information include personal devices such as smart phones, smart watches, smart TVs, smart thermostats, and smart refrigerators that already provide a vast array of motion, environmental and position sensors that can measure acceleration, ambient room temperature, gravity, rotation, ambient light level, linear acceleration, ambient geomagnetic field, ambient air pressure, proximity, relative ambient humidity, device temperature, but is not limited thereto.

Each of these sensors and combinations thereof, can be leveraged to provide useful information in emergency situations.

"Non-smart", "dumb", or "non-connected" devices referred herein include conventional TVs, stereos, heating and cooling units, refrigerators, freezers, standard appliances, etc. These devices are not connected to a network but can be controlled using infrared, for example, but not limited thereto.

"Devices" referred to herein can include either smart devices, non-smart devices, or both.

The prediction device 101 takes periodic readings via available sensors and reports unusual measurements that exceed a preset threshold. Based on the type of sensor(s) that reported unusual readings and historical information about previous readings, the type of predicted emergency can be inferred by the prediction device 101.

For example, a rapid increase in ambient room temperature over time detected by the prediction device 101 would infer a possible fire emergency. Conversely, a rapid decrease in ambient room temperature (in cold winter climates) may validate a power outage or malfunction.

Information regarding the type of emergency, probability of occurrence, when it is likely to happen, location, etc., can be transmitted to relevant emergency personnel based on the prediction by the prediction device 101.

Whenever a prediction device 101 of one device within an area predicts a possible emergency, relevant emergency personnel may switch other devices within that geographical area into emergency mode, which enables the devices to gather more information.

The detection device 102 detects emergency situations whenever, for example, sensors record sharp spikes in sensor readings within a short duration.

For instance, an instantaneous increase in ambient room temperature detected by the detection device 102 could indicate a fire outbreak. A sharp decrease in linear acceleration, in combination with other sensor readings for prior speed, could indicate a car accident.

Based on the type of sensor(s) that reported unusual readings, the type of emergency can be inferred. For instance, high temperature readings detected by the detection device 101 via a temperature sensor would indicate a fire emergency. High humidity levels detected by the detection device 101 via a humidity sensor could indicate flooding.

Information regarding the type of emergency, time of detection, location, etc., can be transmitted to relevant emergency personnel.

Whenever the detection device 102 of a particular device within an area detect the occurrence of an emergency situation, the devices may automatically switch into emergency mode, therefore enabling the collection and transmission of more information and coordination with other nearby devices to help mitigate the emergency.

When the detections by the detection device 102 that caused the automatic switch to emergency mode have normalized, either due to the readings being a false alarm or some other reason, the devices automatically switch back to normal operating mode.

Figure 2:
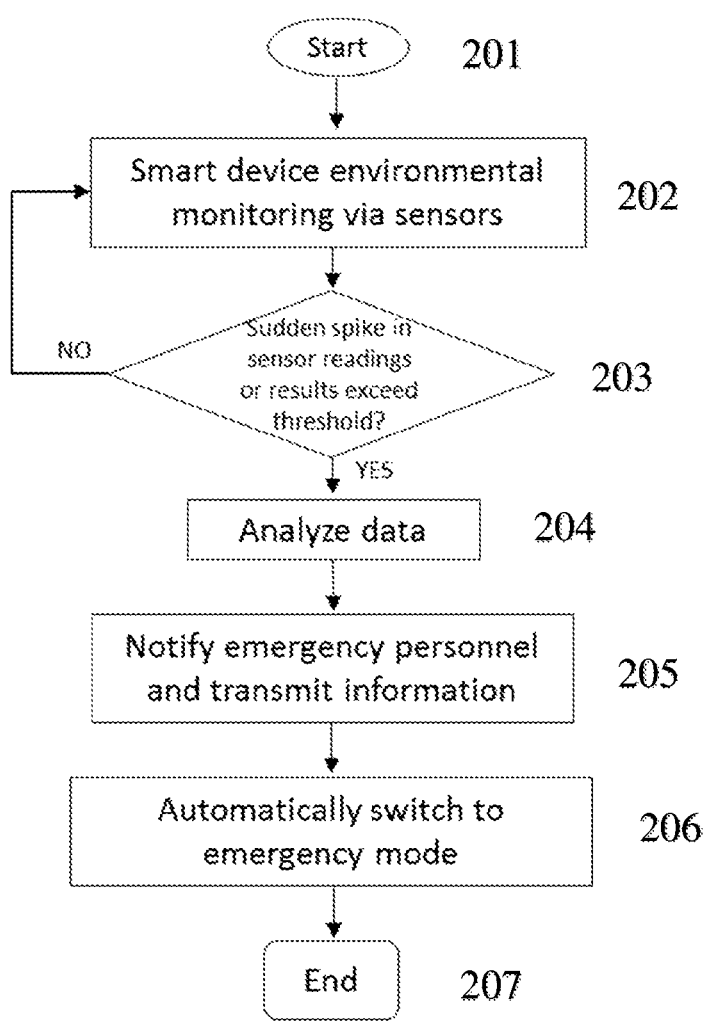
FIG. 2 exemplarily shows a high level flow chart for a detection device 102.

FIG. 2 exemplarily shows a high level flow chart for the detection device 102. The detection device 102 causes a smart device to monitor the environment using sensors as discussed above. The detection device 102 detects if there is a sudden spike in sensor reading or if results read by the sensors exceed a predetermined threshold. If YES, then the detection device 102 proceeds to analyze the data read by the sensors. If NO, the detection device 102 continues to monitor the environment. After the detection device 102 analyzes the data, the detection device 102 signals for the transmitting device 107 to notify emergency personnel and transmit the information. At the same time, the detection device 102 causes the device to automatically switch to the emergency mode such that the emergency mode device 103 can further control the device.

The emergency mode device 103 performs actions when the device is switched to emergency mode as a result of a prediction by the prediction device 101, and/or as a result of a detection by the detection device 102.

It should be noted that emergency mode can be purposely (or affirmatively or manually) activated by emergency personnel such that the emergency personnel can switch available devices within a defined geographical area into emergency mode.

The emergency mode device 103 provides devices in emergency mode with the functions of sensing, mapping, recording and transmission capabilities that provide information (to other devices or to emergency personnel, for example) regarding the presence of people within the area, objects that are within the area, heat map representation and information of the area, origin of emergency (e.g., fire, flood, gas leak, etc.), atmospheric changes, and safe and unsafe areas, but not limited thereto.

The emergency mode device 103 causes devices in emergency mode to coordinate with other smart and non-smart devices in the area via any available connection mechanisms such as infra-red, Bluetooth, WiFi, etc.

Coordination among devices in emergency mode by the emergency mode device 103 enables the gathering of more detailed information, actuation of smart and non-smart devices within the vicinity, emitting warning signals via other devices in the area.

The emergency mode device 103 enables devices in emergency mode to transmit information to predefined locations or back to the device that switched them into emergency mode.

Figure 3:
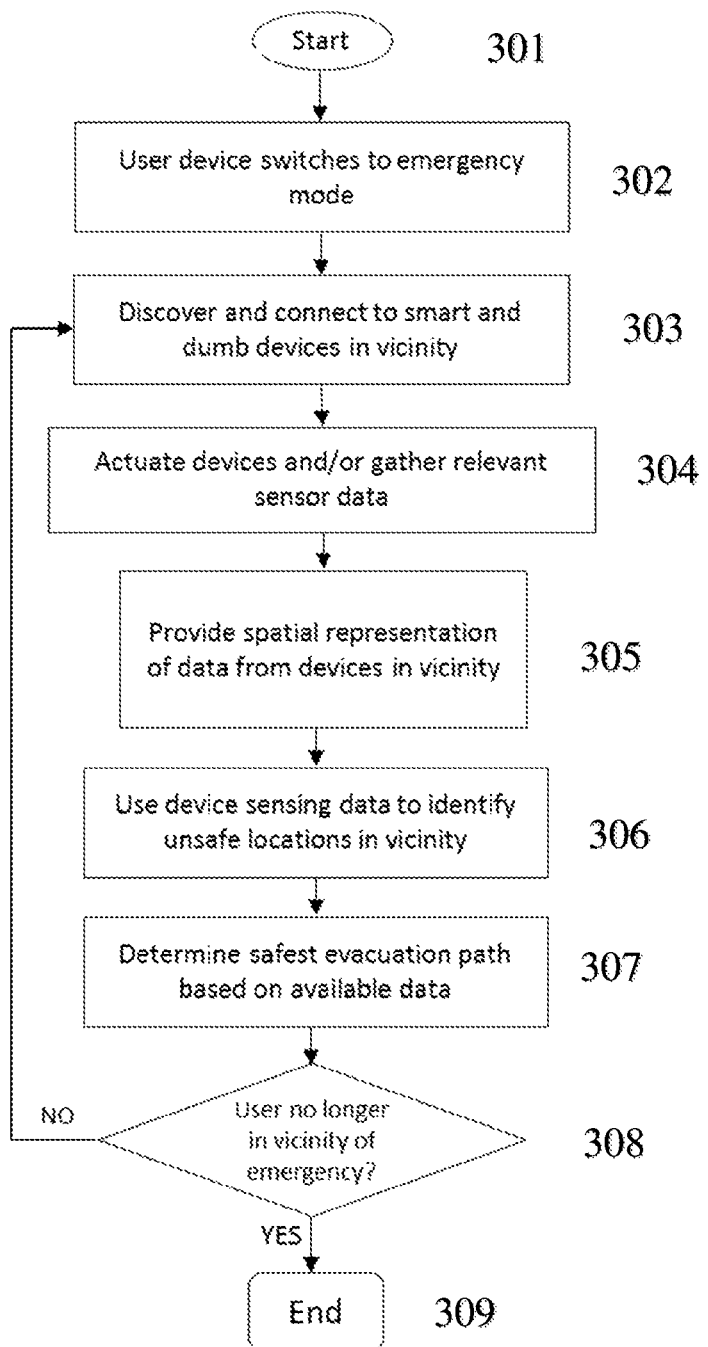
FIG. 3 exemplarily shows a high level flow chart for a emergency mode device 103.

FIG. 3 exemplarily shows a high level flow chart for the emergency mode device 103. The emergency mode device 103 is activated and the device is switched into emergency mode by the prediction device 101, the detection device 102, and/or emergency personnel. While in emergency mode, the emergency mode device 103 causes the actuation and discovery device 104 to discover and connect the device to other devices within a vicinity. The actuation and discovery device 104 then actuates the devices and/or gathers sensor data from the other devices. Next, the emergency mode device 103 computes a spatial representation of the devices that were discovered by the actuation and discovery device 104. Based on the spatial representation of the devices and the sensor data of the devices, the emergency mode device 103 identifies unsafe locations in the vicinity of the device. The emergency mode device 103 then generates a safest evacuation path based on available data from the other devices. For example, if some devices are not in an unsafe situation, the emergency mode device 103 will direct the devices that are in an unsafe situation to the area of the devices that are not in an unsafe area. The emergency mode device 103 repeats the steps in FIG. 3 until the user is no longer in the vicinity of the emergency.

The notification device 104 initiate notifications (i.e., warning signals) on surrounding devices such as TVs, stereos, radio when the device is in emergency mode.

The notification device 104 can notify other devices by, for example, switching a TV to a designated TV channel during emergency situations, emitting an emergency sound on surrounding audio devices, causing an appliance alarm to activate, etc.

By the notification device 104 issuing warning messages, sounds and alerts regarding emergency situations can be spread around a particular vicinity (e.g. within a house or within a room).

Spreading these warning signals can done via Bluetooth, infrared or other connection mechanisms to communicate with the devices.

The notification device 104 can perform the notification at any time and can be done by any device. That is, the initial device can cause an alarm to sound on that device or a second device that has been discovered by the actuation and discovery device 105 can have an alarm or predetermined function be performed by the notification device 104.

The actuation and discovery device 105 allows smart devices in emergency mode to carry out discovery of other smart and non-smart devices in the vicinity.

The discovery by the actuation and discovery device 105 can be done via wireless connection mechanisms such as infrared, Bluetooth and WiFi.

Whenever new devices are discovered by the actuation and discovery device 105, information pertaining to these devices is relayed back to the smart "control device" that was used to switch the initial smart devices into emergency mode.

Based on the information provided about discovered devices, the "control device" can trigger relevant actions that may help mitigate the emergency before the arrival of emergency personnel.

For instance, if a non-smart cooling system is discovered via infrared amid a fire emergency, a relevant action may be to reduce the target temperature of the cooling system. The actuation and discovery device 105 discovers the cooling system and then activates the cooling system to the target temperature.

Another instance is discovery of a smart home control system providing the ability to remotely unlock doors to let emergency personnel in.

The states of discovered devices is constantly monitored to detect if they are still available or have been affected by the emergency.

The devices include predetermined instructions to perform based on receiving a signal from the actuation and discovery device 105. For example, a refrigerator can have predetermined instructions to shut off so as to decrease chances of an electrical fire in the event of a flood or for a stove to include instructions so as to sound an alarm.

Figure 4:
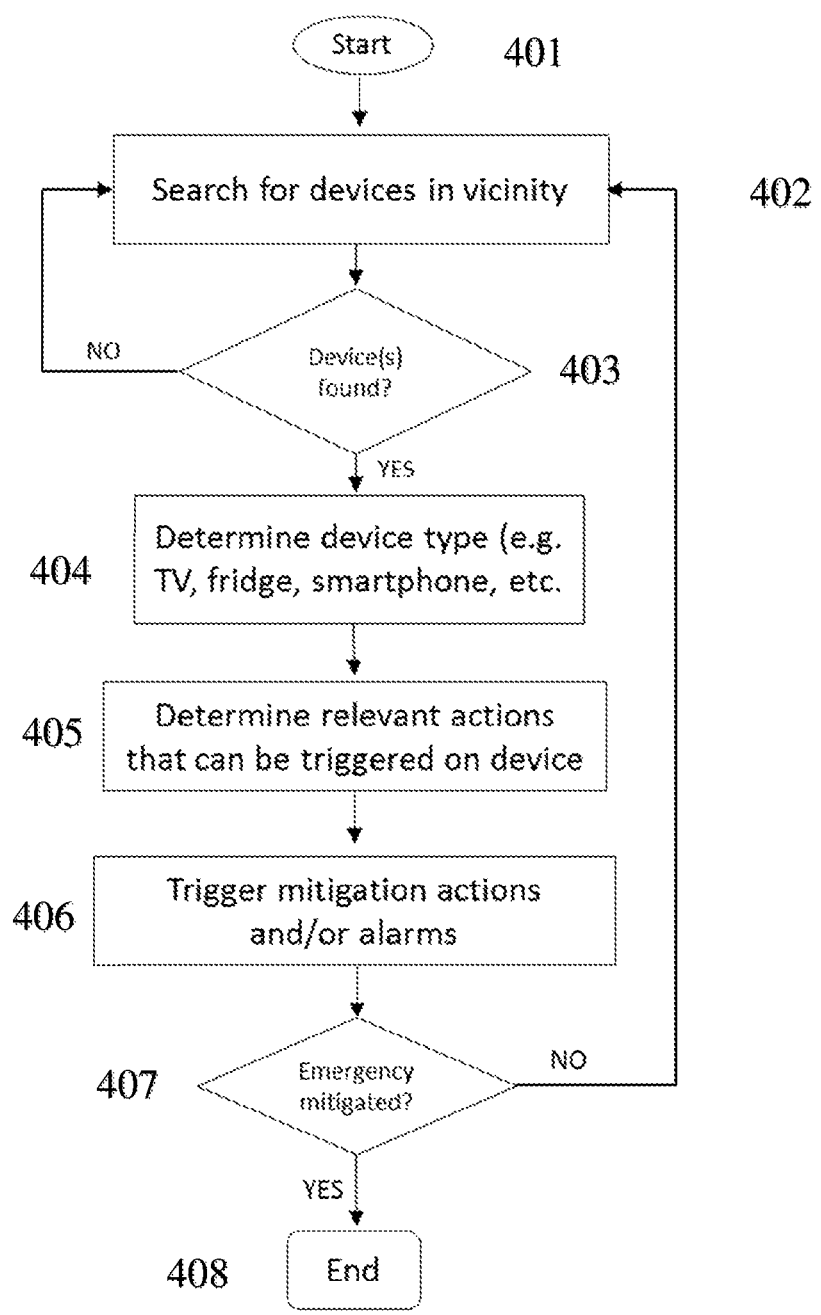
FIG. 4 exemplarily shows a first high level flow chart for a actuation and discovery device 105.

FIG. 4 exemplary shows a first embodiment of a flow chart for the actuation and discovery device 105. The actuation and discovery device 105 searches for devices in the vicinity of the device in emergency mode. If devices are found (YES), then the actuation and discovery device 105 determines the type of device (i.e., smart device or non-smart device). If devices are not found (NO), the actuation and discovery device 105 continues to search for devices in the vicinity. After the type of devices are determined, the actuation and discovery device 105 further determines what type of action can trigger the device. For example, if the actuation and discovery device 105 discovers a television that is a non-smart device, the actuation and discovery device 105 will determine that an infrared signal is needed to trigger the television. If the actuation and discovery device 105 discovers a cell-phone that is a smart device, the actuation and discovery device 105 will determine that a Bluetooth or WiFi signal is needed to trigger the device. After the type of signal needed to trigger the devices is discovered by the actuation and discovery device 105, the actuation and discovery device 105 actuates (i.e., triggers) a type of mitigation action and/or alarm for the device to perform. As discussed above, a television can be turned ON to a specific emergency channel or a cell-phone can be triggered to issue an alert. If the emergency is not mitigated, the actuation and discovery device 105 repeats the steps above.

Figure 5:
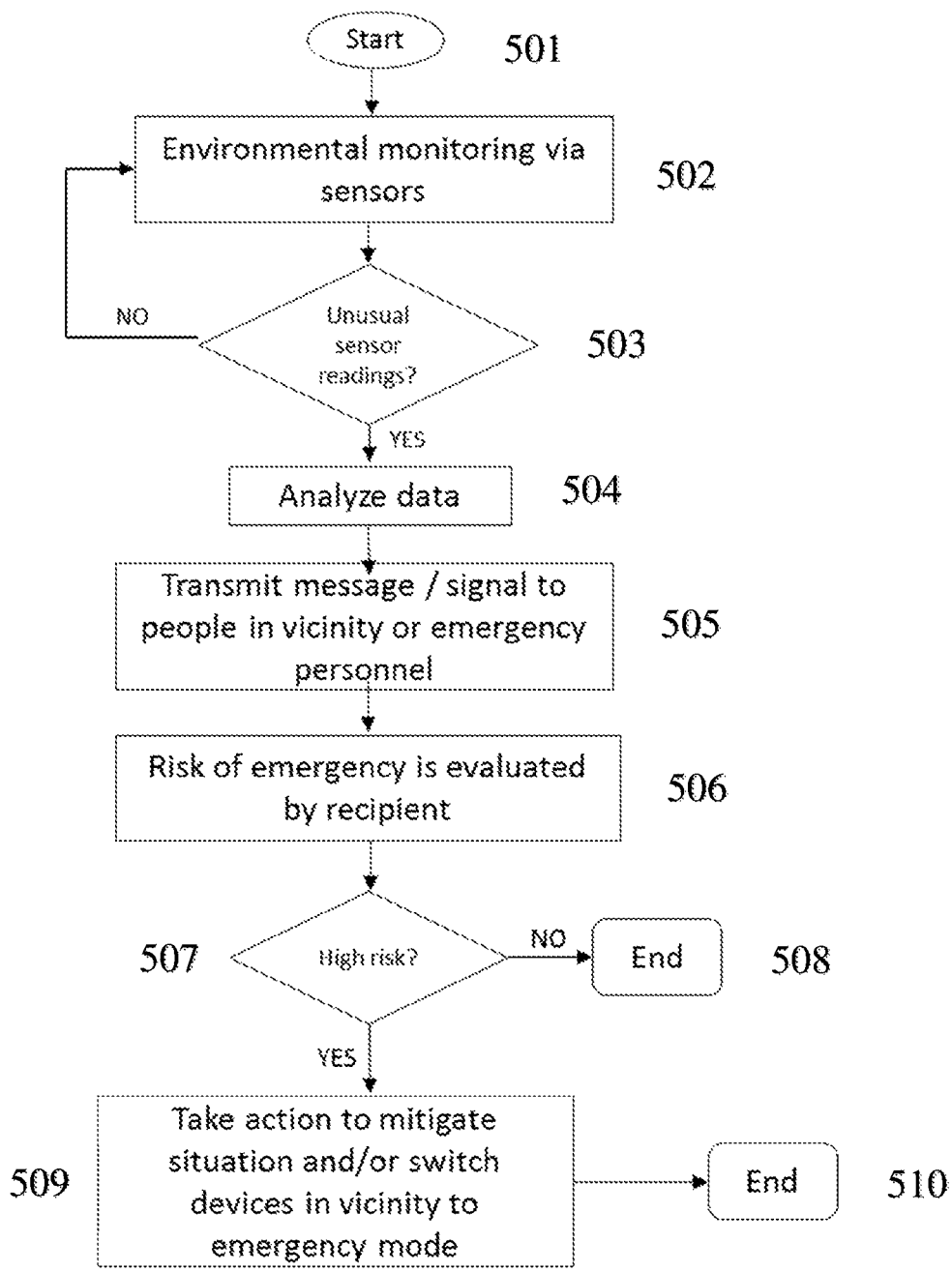
FIG. 5 exemplarily shows a second high level flow chart for an actuation and discovery device 105.

FIG. 5 exemplarily shows a second embodiment of a flow chart for the actuation and discovery device 105. The detection device 102 causes a smart device to monitor the environment using sensors as discussed above. The detection device 102 detects if there is an unusual sensor reading. If YES, then the detection device 102 proceeds to analyze the data read by the sensors. If NO, the detection device 102 continues to monitor the environment. Based on the analyzed data, the actuation and discovery device 105 discovers devices in the vicinity and actuates the device to transmit a message or signal to the devices discovered in the vicinity. The actuation and discovery device 105 of the recipient device of the signal then determines a risk level of the recipient device. If the risk is high (YES), then the actuation and discovery device of the recipient device takes actions to mitigate the situation and/or alert other devices in a particular vicinity of the recipient device that may not have been in the vicinity of the transmitting device. If NO, the recipient device does not perform any actions.

The transmitting device 106 acts as a transmitter such that the device can transmit the information to emergency personnel.

Based on the above configuration of the emergency system 100, the emergency system 100 realizes the benefit of allowing non-smart devices to be utilized in an emergency prevention network. That is, the smart devices can be configured to transmit signals to the non-smart devices. Further, the devices are configured such that the emergency mode can be activated by external inputs from other devices or emergency personnel. Also, the non-smart devices are able to receive instructions based on the sensors in the smart devices.

The steps of FIG. 4 and FIG. 5 can be utilized together or singly.

Figure 6:
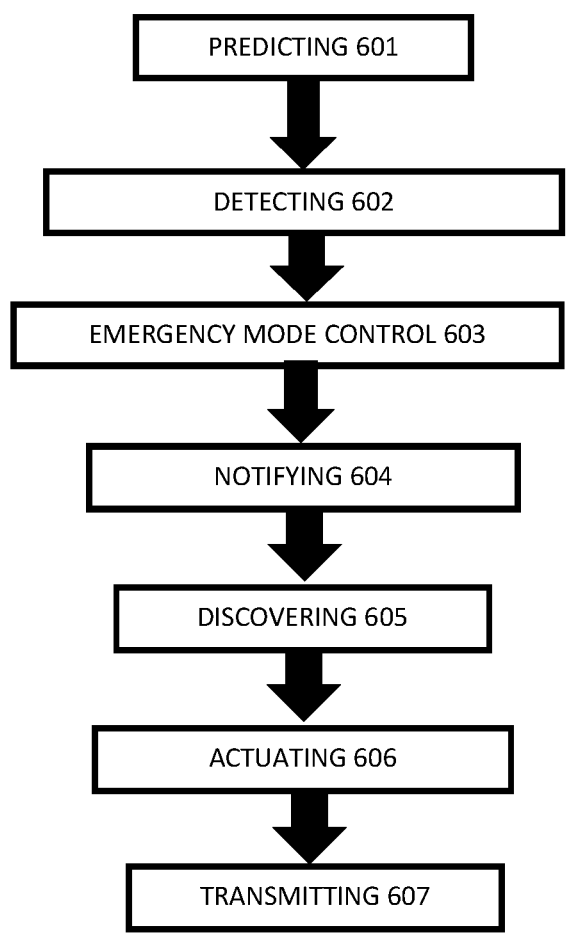
FIG. 6 exemplarily shows a high level flow chart for an emergency method.

FIG. 6 shows a high level flow chart for a method 600 of emergency detection and mitigation.

Step 601 predicts a likelihood of an occurrence of an emergency situation.

Step 602 detects if an emergency situation is occurring and switches the device to emergency mode.

After the device has been switched to emergency mode by either step 603 or externally by an emergency personnel, Step 603 controls the device in emergency mode such that the device functions in emergency mode to detect people, objects, generate heat map information, identify origin of emergency (e.g., fire, flood, etc.), identify unsafe areas, detect atmospheric changes, coordinate with nearby smart and non-smart devices, etc.

Once the device is controlled by Step 603, Step 604 provides emergency alert notifications through surrounding smart and non-smart devices.

Step 605 discovers other devices in a particular vicinity of the device that is in emergency mode and that is controlled by step 603.

Step 606 mitigates emergencies by actuating surrounding smart and non-smart devices in a vicinity of the device in ways that may help counteract the emergency situation (e.g., turning an air conditioning unit to the lowest cooling setting if fire is suspected nearby).

Step 607 transmits details of the emergency detected by the sensors of a device in emergency mode to emergency personnel.

Based on the above, an ad hoc network between smart devices and non-smart devices is created so as to provide contextual and localized information that can be used to address the emergency situation.

That is, the described emergency system, method, and non-transitory recording medium can provide a system for instrumenting and coordinating multiple personal devices and appliances so that they are able to predict, detect, report, monitor and mitigate emergency situations using device sensing, actuating and location identification. Further, the creation of the ad hoc network of existing smart and non-smart devices can proactively determine whether there is a potential for an emergency situation and engaging all the devices in the vicinity in the sensing mode. Also, the emergency system, method, and non-transitory recording medium can enable the transmission of alerts and associated data to people in the vicinity and emergency personnel for appropriate emergency responses.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personnel computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices e.g., network card, modem, etc.) that enable computer system/server 12 to communicate with one or more other computing devices. Such communication can occur via Input/Output (110) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 8, illustrative cloud computing environment 50 is depicted. As shown, cloud computing environment 50 comprises one or more cloud computing nodes 10 with which local computing devices used by cloud consumers, such as, for example, personnel digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the emergency system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An emergency system, comprising an actuation and discovery device configured to create an ad hoc network between a first device and second devices, as a result of discovering an emergency situation in a same location as the first device, the second devices including non-smart devices comprising at least two of a consumer device and an appliance that receives contextual and localized information from the first device including a smart device such that the ad hoc network performs a mitigation action that combines a utility of the second devices based on data received from the first device in the same location as the second devices, via the non-smart devices, as instructed by the actuation and discovery device to mitigate and stop the emergency situation detected by the first device.

2. The emergency system of claim 1, further comprising a prediction device configured to predict a likelihood of an occurrence of the emergency situation.

3. The system of claim 1, further comprising:
   a detection device configured to detect an emergency situation of a plurality of emergency situations and switch a first device to an emergency mode; and
   an emergency mode device configured to gather information regarding the emergency situation while the first device is in the emergency mode.

4. The system of claim 3, wherein the detection device is further configured to switch the second devices to the emergency mode.

5. The system of claim 1, wherein the first device and the second devices are switched to emergency mode by a manual external input.

6. The system of claim 3, wherein the information gathered by the emergency mode device includes at least one of:
   a presence of people within a predetermined area of the emergency situation;
   objects that are within the predetermined area of the emergency situation;
   a heat map representation of the predetermined area;
   an origin of the emergency situation;

an atmospheric change;
a safe area; and
an unsafe area.

7. The system of claim 1, wherein the second devices includes predetermined instructions to perform based on receiving a signal from the actuation and discovery device.

8. The system of claim 1, further comprising a notification device configured to cause at least one of the first device and the second devices to emit a notification.

9. The system of claim 1, further comprising a transmitting device configured to transmit the information regarding the emergency situation to emergency personnel.

10. The system of claim 3, wherein the actuation and discovery device calculates a risk level associated with the emergency situation based on the information regarding the emergency situation gathered by the emergency mode device, and
wherein the actuation and discovery device actuates the second device to perform the action when the risk level is greater than a predetermined threshold value.

11. The system of claim 1, wherein the first device and the second devices include a sensor configured to measure at least one of:
acceleration;
ambient room temperature;
gravity;
rotation;
ambient light level;
linear acceleration;
ambient geomagnetic field;
ambient air pressure;
proximity;
relative ambient humidity; and
temperature of the first device and the second device.

12. The system of claim 1,
wherein the first device and the second devices are switched to the emergency mode by any one of:
a manual external input;
the prediction device; and
the detection device.

13. The system of claim 3, wherein the actuation and discovery device discovers a plurality of devices in the same location as the first device and actuates each of the plurality of devices to perform an action based on the emergency situation detected by the detection device.

14. A non-transitory computer-readable recording medium recording an emergency program, the program causing a computer to perform:
creating an ad hoc network between a first device and second devices, as a result of discovering an emergency situation in a same location as the first device, the second devices including non-smart devices comprising at least two of a consumer device and an appliance that receives contextual and localized information from the first device including a smart device such that the ad hoc network performs a mitigation action that combines a utility of the second devices based on data received from the first device in the same location as the second devices, via the non-smart devices, to mitigate and stop the emergency situation detected by the first device.

15. The non-transitory computer-readable recording medium of claim 14, further comprising predicting a likelihood of an occurrence of the emergency situation.

16. The non-transitory computer-readable recording medium of claim 14, further comprising:
detecting an emergency situation of a plurality of emergency situations and switching a first device to an emergency mode; and
gathering information regarding the emergency situation while the first device is in the emergency mode.

17. The non-transitory computer-readable recording medium of claim 16, wherein the detecting is further configured to switch the second devices to the emergency mode.

18. The non-transitory computer-readable recording medium of claim 14, wherein the first device and the second devices are switched to emergency mode by a manual external input.

19. The non-transitory computer-readable recording medium of claim 13, wherein the information gathered includes at least one of:
a presence of people within a predetermined area of the emergency situation;
objects that are within the predetermined area of the emergency situation;
a heat map representation of the predetermined area;
an origin of the emergency situation;
an atmospheric change;
a safe area; and
an unsafe area.

20. An emergency method, comprising creating an ad hoc network between a first device and second devices, as a result of discovering an emergency situation in a same location as the first device, the second devices including non-smart devices comprising at least two of a consumer device and an appliance that receives contextual and localized information from the first device including a smart device such that the ad hoc network performs a mitigation action that combines a utility of the second devices based on data received from the first device in the same location as the second devices, via the non-smart devices, to mitigate and stop the emergency situation detected by the first device.

* * * * *